United States Patent
Ishigaki

(10) Patent No.: US 11,993,218 B2
(45) Date of Patent: May 28, 2024

(54) OCCUPANT PROTECTION DEVICE

(71) Applicant: Autoliv Development AB, Vargarda (SE)

(72) Inventor: Ryota Ishigaki, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/005,142

(22) PCT Filed: Jun. 9, 2021

(86) PCT No.: PCT/JP2021/021840
§ 371 (c)(1),
(2) Date: Jan. 11, 2023

(87) PCT Pub. No.: WO2022/014207
PCT Pub. Date: Jan. 20, 2022

(65) Prior Publication Data
US 2023/0256928 A1    Aug. 17, 2023

(30) Foreign Application Priority Data
Jul. 14, 2020 (JP) .................................. 2020-120434

(51) Int. Cl.
*B60R 21/207* (2006.01)
*B60R 21/264* (2006.01)
*B60R 21/215* (2011.01)

(52) U.S. Cl.
CPC .......... *B60R 21/207* (2013.01); *B60R 21/264* (2013.01); *B60R 2021/21506* (2013.01)

(58) Field of Classification Search
CPC .... B60R 21/207; B60N 2/42; B60N 2/42763; B60N 2/427; B60N 2/42754; B60N 2/4263; B60N 2/00; B60N 2/4279
See application file for complete search history.

(56) References Cited

U.S. PATENT DOCUMENTS 7,784,866 B2 *  8/2010  Yoshikawa ........ B60N 2/42763
                                                          297/216.1
9,428,137 B2 *  8/2016  Lee .................... B60N 2/42718
(Continued)

FOREIGN PATENT DOCUMENTS

JP    2005-255148 A    9/2005
JP    2010-52535 A     3/2010
(Continued)

*Primary Examiner* — Amy R Weisberg
*Assistant Examiner* — Tiffany L Webb
(74) *Attorney, Agent, or Firm* — Foley & Lardner LLP

(57) ABSTRACT

An occupant protecting device provided inside or below a seat cushion of a vehicle seat, comprising an airbag cushion capable of expanding and deploying a seat surface of the seat cushion; and an inflator. The airbag cushion includes a lower panel, an upper panel longer than the lower panel in the front-rear direction of the vehicle seat, and mutually opposing side panels joined to the lower panel and the upper panel. The airbag cushion has a first mounting point attached to the vehicle seat side and a second mounting point attached to the vehicle seat side on the rear side of the first mounting point in the front-rear direction of the vehicle seat. The lower panel and the upper panel are mutually joined to a first mounting point and a second mounting point.

20 Claims, 11 Drawing Sheets

(56) References Cited

U.S. PATENT DOCUMENTS

| | | | |
|---|---|---|---|
| 10,246,193 B1* | 4/2019 | Finlay | B60N 2/646 |
| 10,710,540 B2* | 7/2020 | Fukawatase | B60N 2/42718 |
| 11,260,818 B2* | 3/2022 | Iida | B60R 21/233 |
| 2013/0056964 A1* | 3/2013 | Yamashita | B60N 2/42763 |
| | | | 280/730.1 |

FOREIGN PATENT DOCUMENTS

| | | |
|---|---|---|
| JP | 2013-75599 A | 4/2013 |
| JP | 2020-19330 A | 2/2020 |
| KR | 10-2016-0036816 A | 4/2016 |
| WO | 2006/003749 A1 | 1/2006 |

* cited by examiner

FIG. 3A
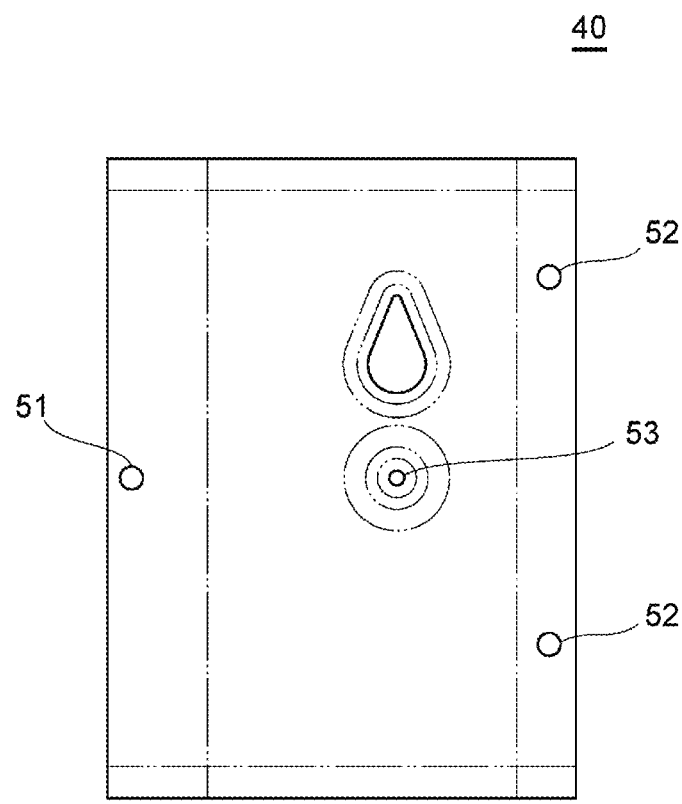
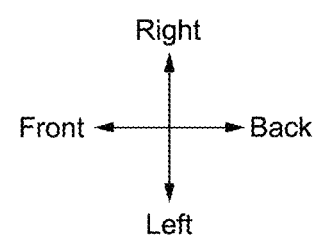

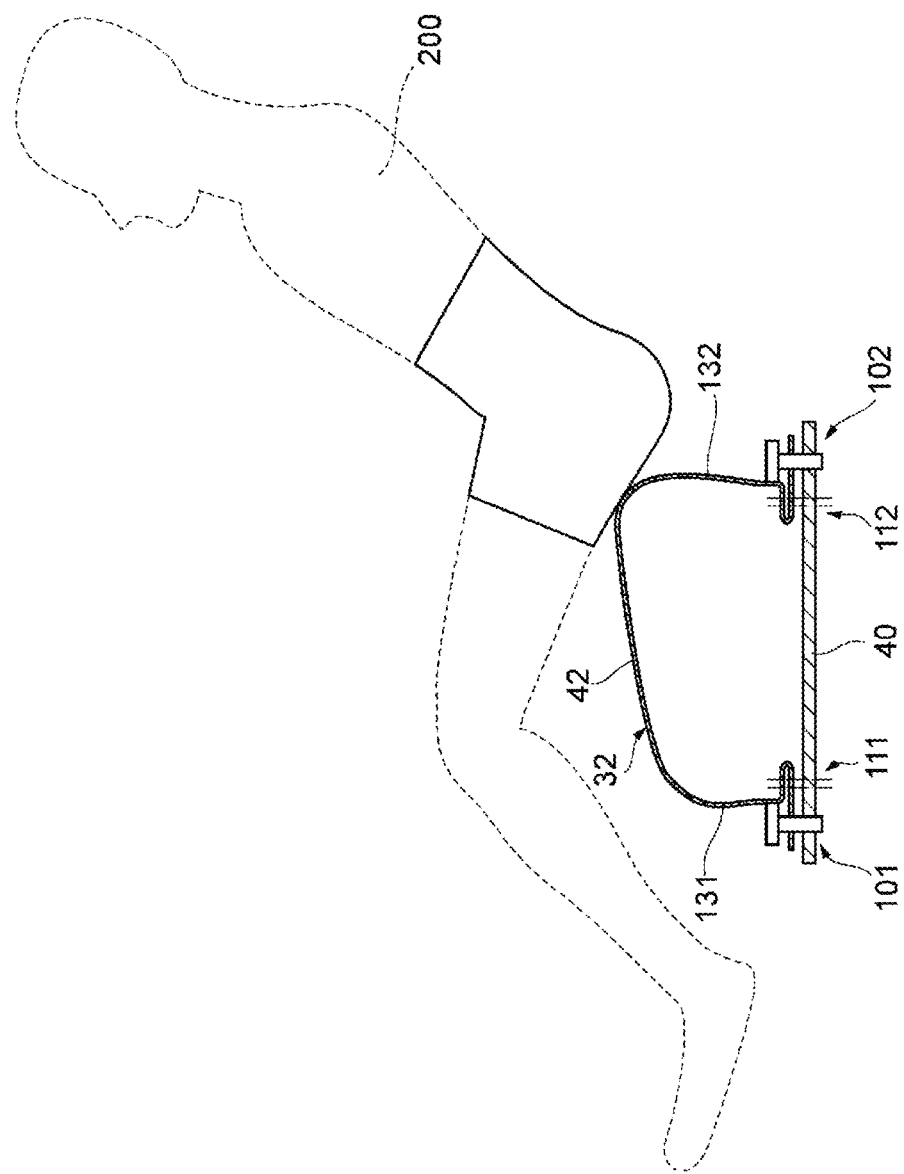

OCCUPANT PROTECTION DEVICE

TECHNICAL FIELD

The present invention relates to an occupant protecting device provided inside or below a seat cushion of a vehicle seat.

BACKGROUND ART

In the event of a vehicle frontal collision, an occupant will move forward due to inertia. Patent Document 1 describes an occupant protecting device which, in the event of such a frontal collision, raises a front end portion of a seat cushion by instantaneously expanding an airbag in a vehicle seat, thereby suppressing forward movement of the waist of an occupant.

RELATED ART DOCUMENTS

Patent Documents

Patent Document 1: Japanese Unexamined Patent Application No. 2007-118820

SUMMARY OF THE INVENTION

Problem to be Solved by the Invention

In Patent Document 1, an airbag is formed of a 2D (two dimensional) panel formed by overlaying two base fabrics. However, in order for such an airbag to ensure a sufficient stroke for pushing up the front end portion of the seat cushion, the volume of the airbag must be increased.

Furthermore, in Patent Document 1, a knee of an occupant is pushed up by a front end portion of the seat cushion when the airbag is expanded. However, based on the relationship to an attachment mode and arrangement position of the airbag with regard to the vehicle seat, the knee of the occupant is not sufficiently lifted. In order to effectively lift the knee of an occupant, the vicinity of the thigh near the buttocks of the occupant is preferably pushed up to lift up a portion from the thigh of the occupant to the knee as a whole, rather than pushing up only the knee of the occupant as in Patent Document 1.

An object of the present invention is to provide an occupant protecting device that contributes to improving the waist restraining performance of an occupant.

Means to Solve the Problem

The occupant protecting device according to one aspect of the present invention is an occupant protecting device provided inside or below a seat cushion of a vehicle seat, containing:
  an airbag cushion capable of expanding and deploying to push up a seat surface of the seat cushion;
  an inflator that supplies gas for expansion and deployment into the interior space of the airbag cushion in the event of a vehicle emergency, the airbag cushion comprising:
    a lower panel;
    an upper panel with a length in the front-rear direction of the vehicle seat that is longer than that of the lower panel; and
  mutually opposing side panels joined to the lower panel and the upper panel; wherein the interior space is defined by the upper panel, the lower panel, and the mutually opposing side panels,
the airbag cushion having:
  at least one first mounting point provided on at least the lower panel and attached on the vehicle seat side;
  at least one second attaching point provided on at least the lower panel and attached to the vehicle seat side on a rear side of the at least one first attaching point in a front-rear direction of the vehicle seat; and
  the lower panel and the upper panel are mutually joined proximal to each of the at least one first mounting point and the at least one second mounting point.

According to this aspect, the upper panel of the airbag cushion is longer than the lower panel in the front-rear direction of the seat, the upper panel and the lower panel are mutually joined to each other proximal to the first and second mounting points in the front-rear direction of the vehicle seat, and the side panels are joined to the upper panel and the lower panel, thereby demarcating the interior space of the airbag cushion having a 3D (three-dimensional) shape. As a result, as compared with a conventional airbag cushion having a 2D shape, the upward expansion (stroke or depth) between both mounting points can be increased while reducing the overall volume when expanded and deployed. Therefore, when there is an occupant seated on the seat surface in a regular posture, the vicinity of the thigh proximal to the buttocks of the occupant can be effectively pushed up with a larger stroke in relation to the occupant. Therefore, the waist restraining performance of the occupant can be improved.

BRIEF DESCRIPTION OF THE DRAWINGS

FIG. 3A is a plan view illustrating the lower panel of the airbag cushion of the occupant protecting device according to the embodiment prior to sewing.

FIG. 5 is a longitudinal cross-sectional view illustrating a condition of the airbag cushion of the occupant protecting device according to an embodiment expanded and deployed, and also showing the occupant.

DESCRIPTION OF THE PREFERRED EMBODIMENTS

An occupant protecting device according to preferred embodiments of the present invention will be described with reference to the accompanying drawings. In the present document, up and down, left and right, and front and rear are defined as follows. When an occupant is seated in a seat (vehicle seat) in a regular posture, a direction the occupant faces is referred to as the front, a opposite direction is referred to as the rear, and a direction indicating a coordinate axis is referred to as a front-rear direction. Furthermore, when the occupant is seated in the vehicle seat in a regular posture, the right side of the occupant is referred to as a right direction, the left side of the occupant is referred to as a left direction, and a direction indicating a coordinate axis is referred to as a left-right direction. Similarly, when the occupant is seated in a regular posture, a head direction of the occupant is referred to as up, a waist direction of the occupant is referred to as down, and a direction indicating a coordinate axis is referred to as an up-down direction.

Figure 1A:
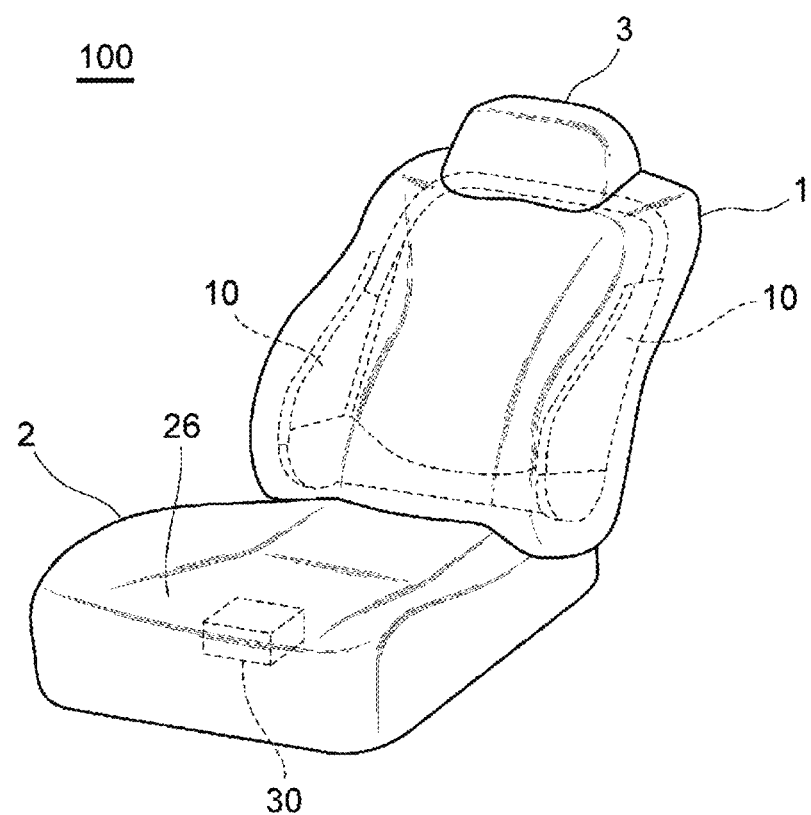
FIG. 1A is a perspective view illustrating an external shape of a vehicle seat provided with an occupant protecting device according to an embodiment.
Figure 1B:
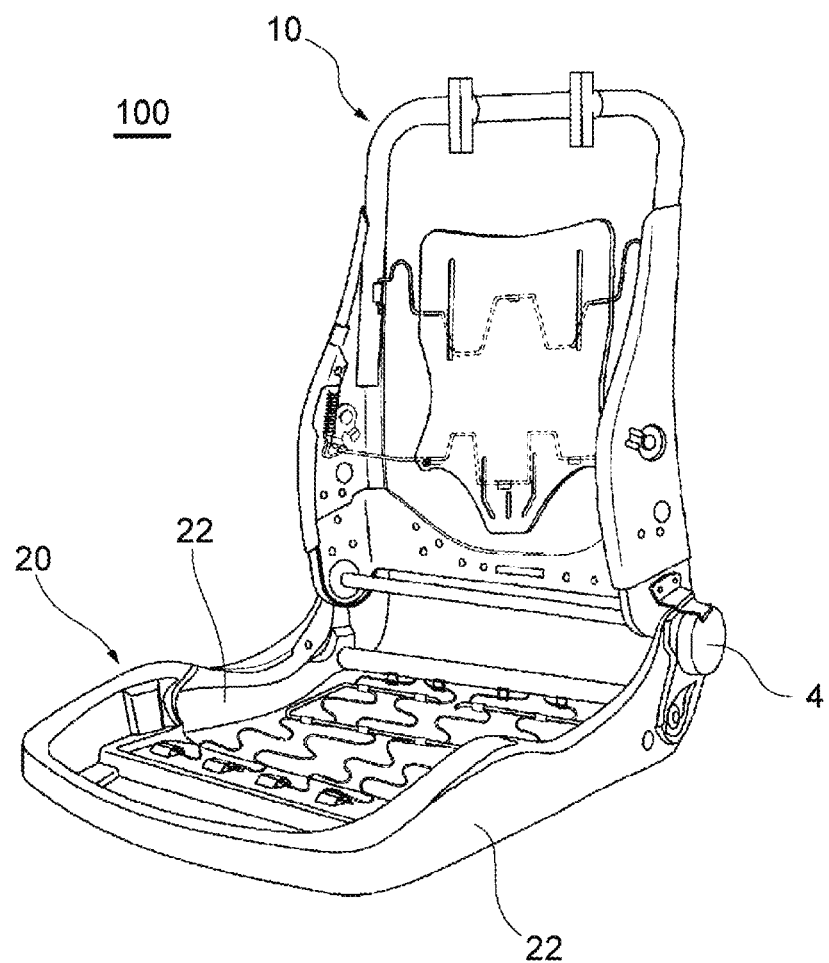
FIG. 1B is a perspective view illustrating a frame structure inside the vehicle seat of FIG. 1A.

As illustrated in FIGS. 1A and 1B, the vehicle seat 100 is provided with a seatback 1 that supports the back of an occupant, a seat cushion 2 on which the occupant is seated, and a headrest 3 that supports the head of the occupant. The vehicle seat 100 is, for example, a driver seat or passenger seat, but may be a rear seat.

A seat frame 10 and a seating frame 20, which form the framework of the seat, are provided inside the seat back 1 and the seat cushion 2, respectively. The seat frame 10 and the seating frame 20 are obtained by processing a metal component or hard resin, and are mutually connected via a reclining mechanism 4. The seating frame 20 has a pair of side frames 22, spaced apart on the left and right, and a seat pan 24 (see FIG. 4C) is bridged between the pair of side frames 22, 22.

The seat cushion 2 has, for example, a seat pad made of a urethane foam material or the like covering a surface and perimeter of the seating frame 20, and a seat cover made of leather, fabric or the like covering a surface of the seat pad. An upper surface of the seat cover configures a surface on which the occupant sits, in other words, a seat surface 26 of the seat cushion 2.

The occupant protecting device 30 is provided inside or below the seat cushion 2. For example, the occupant protecting device 30 is provided inside the seat cushion 2 and is covered by the seat cover. In this case, the occupant protecting device 30 may be provided on an upper surface of the seat pan 24. Alternatively, if the seat pan 24 is not provided, placing in the seating frame 20 is possible. In another example, the occupant protecting device 30 is provided below the seat cushion 2 instead of inside the seat cushion 2. In this case, for example, the occupant protecting device 30 is mounted on a bracket secured to the vehicle seat 100 below the seat cushion 2. Hereinafter, an example in which the occupant protecting device 30 is provided on the upper surface of the seat pan 24 will be described.

Figure 2:
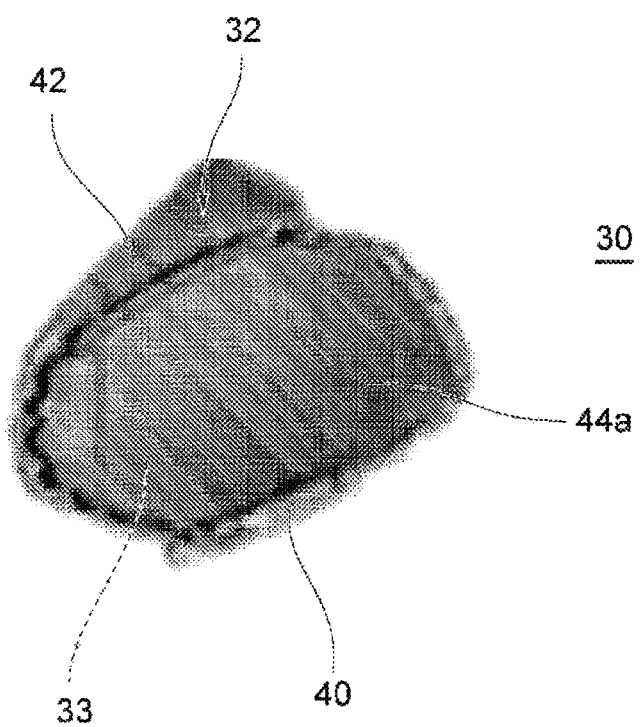
FIG. 2 is a perspective view illustrating a condition of the airbag cushion of the occupant protecting device according to an embodiment expanded and deployed.

As illustrated in FIG. 2, the occupant protecting device 30 is provided with an airbag cushion 32 capable of expansion and deployment, and an inflator 34 (see FIG. 4C) that supplies gas for expansion and deployment to the interior space 33 of the airbag cushion 32 in the event of a vehicle emergency. An example of a vehicle emergency is a frontal collision of a vehicle.

The inflator 34 is electrically connected to a vehicle side ECU. For example, the inflator 34 receives a signal that an impact upon a frontal collision of the vehicle has been detected from the vehicle side ECU and operates to instantly supply the gas to the airbag cushion 32. The inflator 34 can be one of various types of inflators, such as inflators filled with a gas generating agent, compressed gas, or both, and the like. By way of example, the inflator 34 has an igniting device at an open end portion of a cylindrical body with a bottom. Furthermore, when a gas generating agent in the cylindrical body is ignited using the igniting device, gas is generated, and the gas for expansion and deployment is supplied into the airbag cushion 32 from a plurality of injection holes located on a peripheral surface of the cylindrical body.

The airbag cushion 32 is a bag body and expands and deploys by receiving the supply of gas from the inflator 34. The airbag cushion 32 is formed, for example, by joining (sewing or adhering) a plurality of pieces of base fabric made of a non-woven fabric or the like at appropriate positions. Herein, the airbag cushion 32 has a lower panel 40, an upper panel 42, and mutually opposing side panels 44a, 44b (see: FIG. 3C). Furthermore, the panels 40, 42, 44a, 44b are made of a non-woven fabric and are joined by sewing.

As illustrated in FIG. 3A, the lower panel 40 is formed in, for example, a rectangular shape. The lower panel 40 has a front mounting hole 51, rear mounting holes 52, 52 and a center mounting hole 53. The front mounting hole is formed at the center in the left-right direction in the front end portion of the lower panel 40. The rear mounting holes 52, 52 are formed in a rear end portion of the lower panel 40 so as to be spaced apart from each other in the left-right direction. The center mounting hole 53 may be formed at any position between the front mounting hole 51 and the rear mounting holes 52, 52 in the front-rear direction and the left-right direction of the lower panel 40. The holes are formed at an optimum position as appropriate in accordance with the size of the inflator 34 to be used, the pitch of the stud bolts (34a to be described later), and the layout of the vehicle seat. However, if the center mounting hole 53 can be formed in the center portion in the front-rear direction and the left-right direction of the lower panel 40, the center mounting hole 53 is preferably formed in a center portion. In this case, the positions of the front mounting hole 51 and the rear mounting holes 52, 52 are, for example, at the apexes of an isosceles triangle, and the center mounting hole 53 is positioned on the bisector of the isosceles triangle.

The front mounting holes 51, rear mounting holes 52, 52 and center mounting holes 53 are holes where fasteners are used to attach the lower panel 40 to a prescribed position on the vehicle seat 100 side. The fastener is, for example, a bolt, rivet, or the like. Herein, the center mounting hole 53 may constitute a mounting point (third mounting point) for attaching the inflator 34 to the vehicle seat 100 side together with the lower panel 40. For example, when the aforementioned cylindrical body with a bottom is used as the inflator 34, the inflator is provided on the lower panel 40 with the axial direction of the cylindrical body aligned with the left-right direction. Furthermore, a stud bolt 34a protruding from an outer peripheral portion of the cylindrical body (see: FIG. 4C) protrudes from the center mounting hole 53 to an outer side of the airbag cushion 32 (below the lower panel 40) and is fastened and secured to the seat pan 24 by a nut. Thereby, the inflator 34 and the lower panel 40 are co-fastened to the seat pan 24 by the stud bolt 34a and a nut.

Figure 3B:
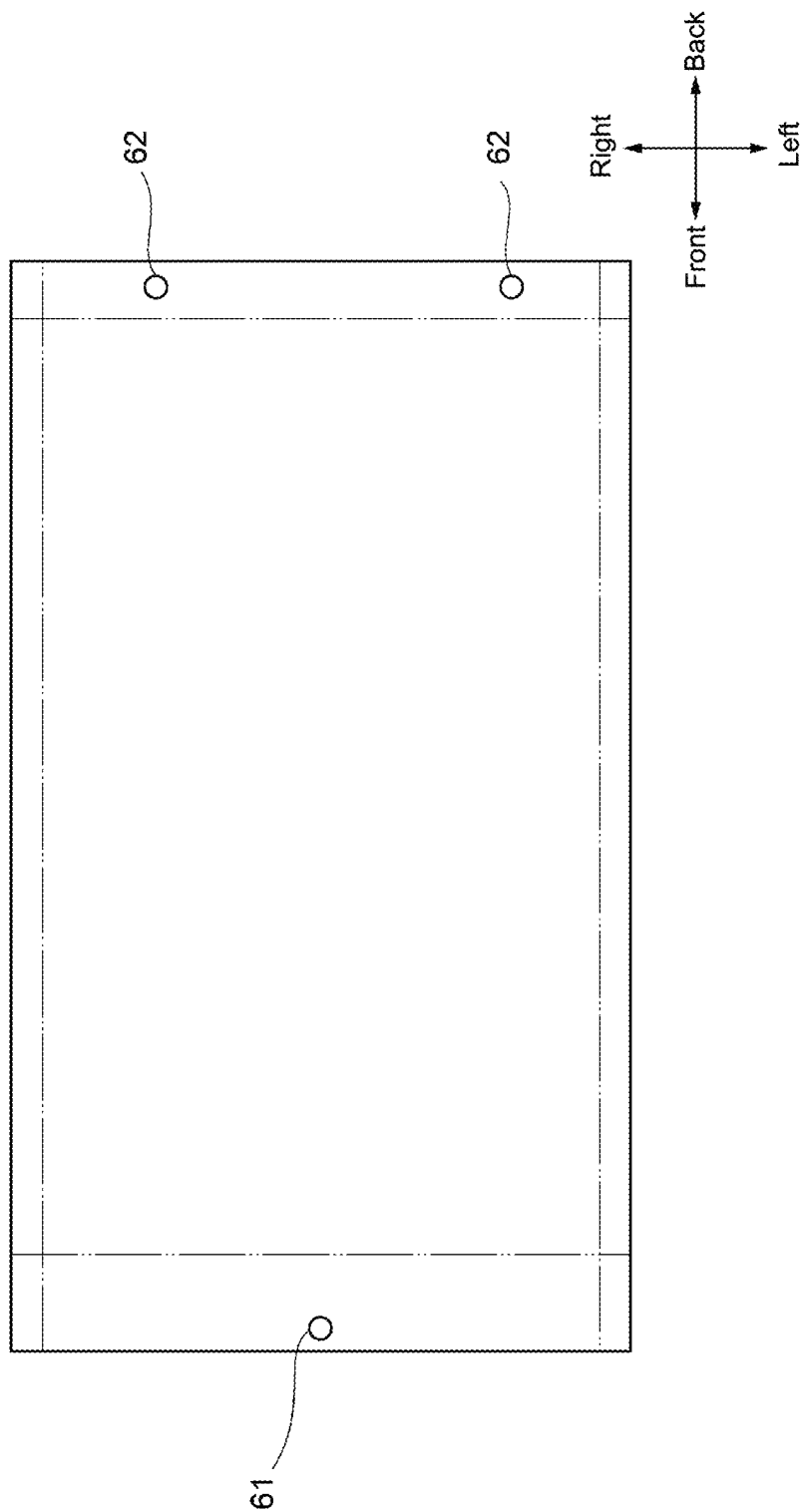
FIG. 3B is a plan view illustrating the upper panel of the airbag cushion of the occupant protecting device according to the embodiment prior to sewing.
Figure 3C:
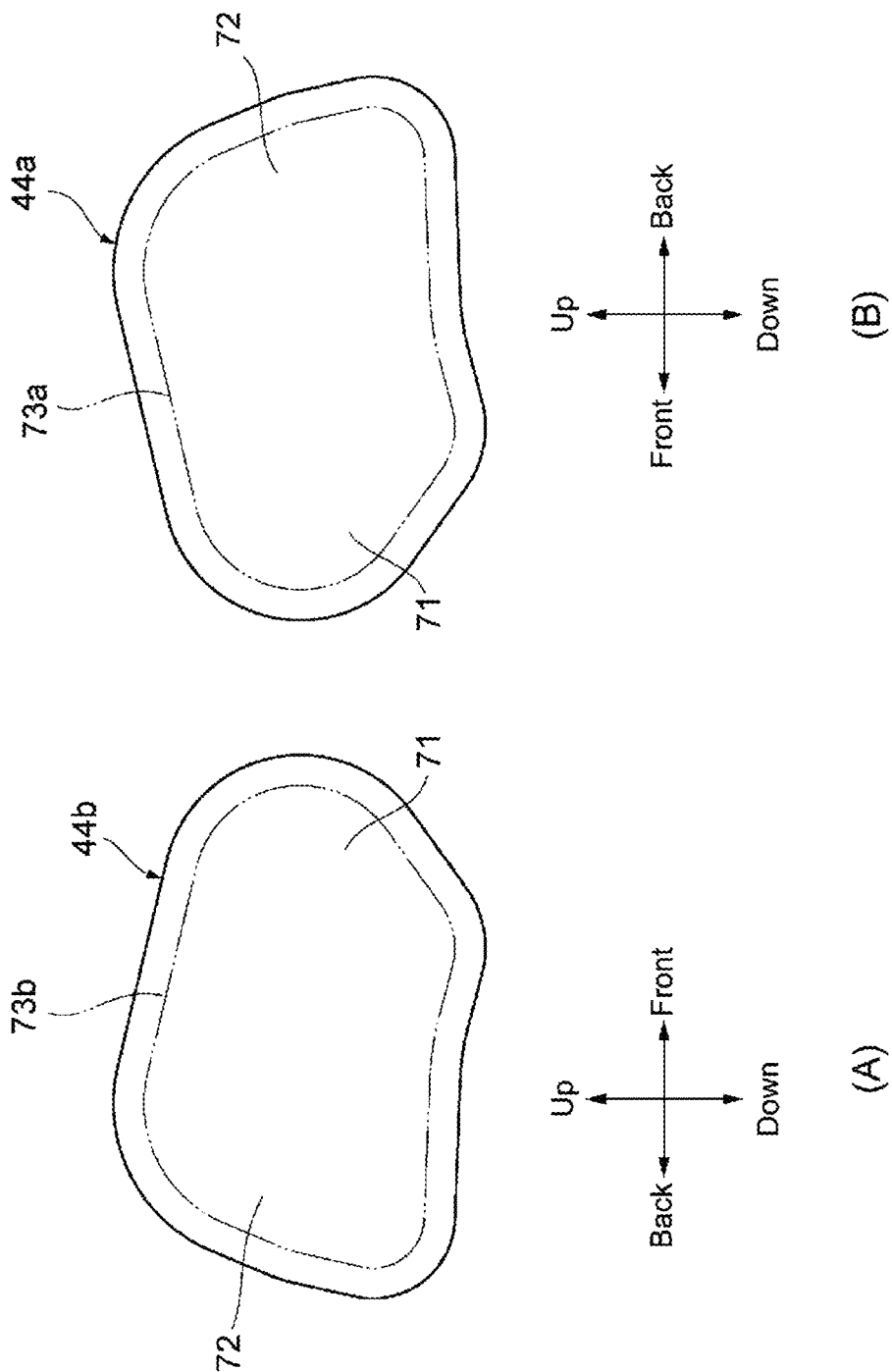
FIG. 3C is a plan view illustrating the side panel of the airbag cushion of the occupant protecting device according to the embodiment prior to sewing.

As illustrated in FIG. 3B, the upper panel 42 is formed in, for example, a rectangular shape. The upper panel 42 is formed with a length in the front-rear direction of the vehicle seat 100 that is longer than the length of the lower panel 40. In terms of length in the left-right direction, the upper panel 42 and the lower panel 40 are the same or substantially the same.

The upper panel 42 has a front mounting hole 61 and rear mounting holes 62, 62. The front mounting hole 61 is formed at the center in the left-right direction in the front end portion of the upper panel 42. The rear mounting holes 62, 62 are formed in a rear end portion of the upper panel 42 so as to be spaced apart from each other in the left-right direction. The front mounting hole 61 and the rear mounting holes 62, 62 are holes where fasteners are used to attach the upper panel 42 to a prescribed position on the vehicle seat 100 side. The positions in the left-right direction of the front mounting hole 61 and the rear mounting holes 62, 62 of the upper panel 42 are the same as the positions of the front mounting hole 51 and the rear mounting holes 52, 52 of the lower panel 40.

As illustrated in FIG. 3C (A) and (B), the side panels 44a, 44b are formed, for example, in shapes that are mutually paired (symmetrical shapes). Furthermore, the side panels 44a, 44b are formed such that the height (dimension in the up-down direction) of the rear side portion 72 is larger than the height of the front side portion 71. The side panels 44a, 44b are joined to the lower panel 40 and the upper panel 42. Specifically, the side panels 44a, 44b are sewn to the lower panel 40 and the upper panel 42, with seam lines 73a, 73b along a perimeter part.

Figure 4A:
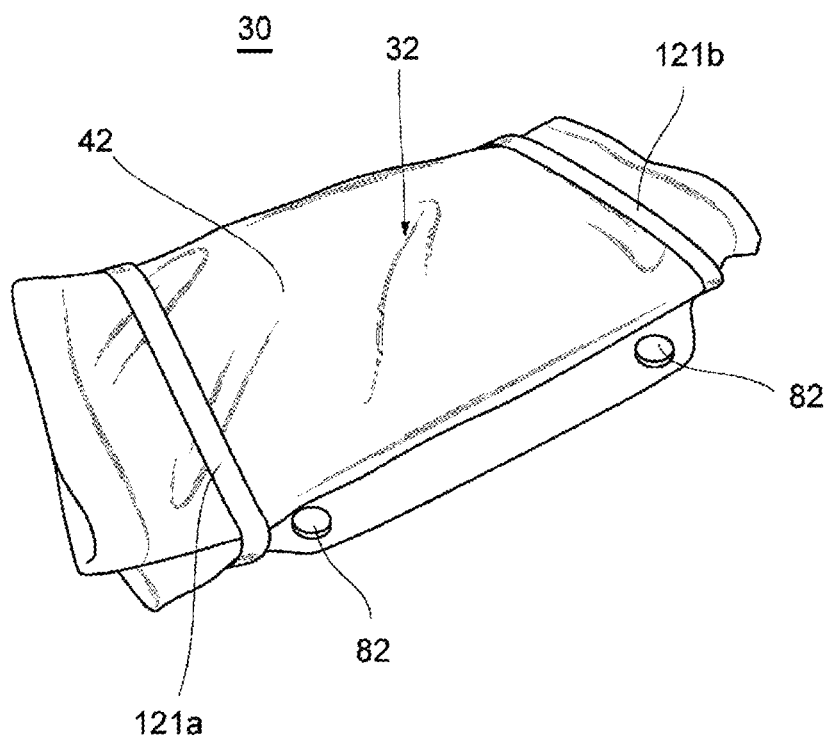
FIG. 4A is a perspective view illustrating the occupant protecting device according to the embodiment prior to installation on the seat pan of a vehicle seat.
Figure 4B:
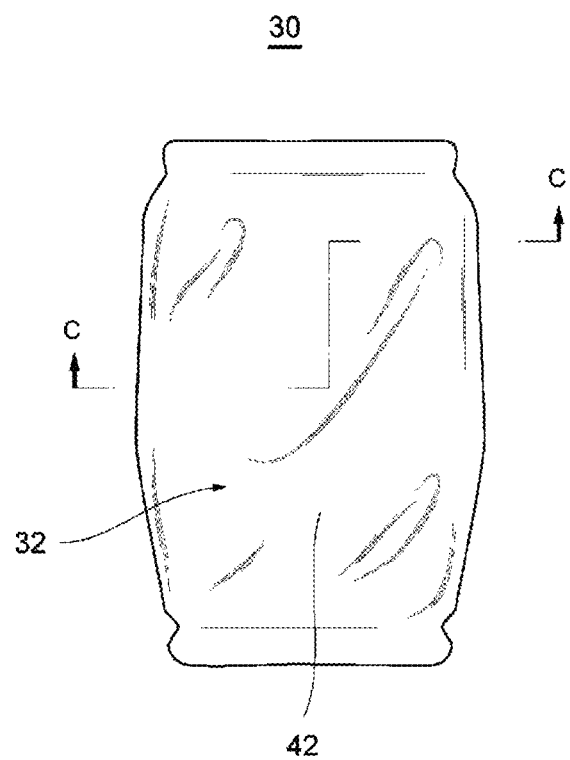
FIG. 4B is a plan view illustrating the occupant protecting device according to the embodiment prior to installation on the seat pan of a vehicle seat.
Figure 4C:
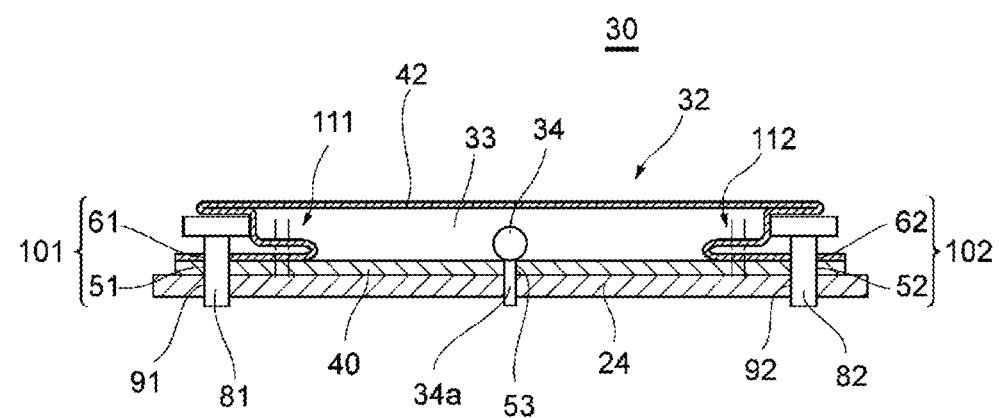
FIG. 4C is a cross-sectional view taken along line C-C of FIG. 4B, illustrating the occupant protecting device after mounting on the seat pan of the vehicle seat.

As illustrated in FIGS. 4A to C, the occupant protecting device 30 accommodates the inflators 34 in the airbag cushions 32 and is mounted on the seat pan 24. In this mounted state, the stud bolt 34a of the inflator 34 is fastened and secured to the seat pan 24 by a nut via the center mounting hole 53 of the lower panel 40.

Furthermore, in this mounted state, the lower panel 40 and the upper panel 42 are attached to the front securing position 91 of the seat pan 24 via the fastener 81 inserted through the front mounting holes 51, 61. Similarly, the lower panel 40 and the upper panel 42 are mounted to a rear securing position 92 of the seat pan 24 via fasteners 82, 82 inserted through the rear mounting holes 52, 52 and 62, 62. The front securing position 91 and the rear securing position 92 are, for example, positions of securing holes formed in the seat pan 24. Note that in relation to an occupant seated in a regular posture, the rear securing position 92 is below a portion of a thigh of the occupant near the buttocks.

In other words, the airbag cushion 32 has a front mounting point 101 (first mounting point) that is mounted to the vehicle seat 100 side, and two rear mounting points 102, 102 (second mounting points) that are mounted to the vehicle seat 100 side on the rear side of the front mounting point 101. Furthermore, the front mounting points 101 are constituted by the front mounting holes 51 and 61 of the lower panel 40 and the upper panel 42, and the rear mounting points 102 are constituted by the rear mounting holes 52 and 62 of the lower panel 40 and the upper panel 42.

Herein, the distance between the front securing position 91 and the rear securing position 92 in the seat pan 24 in the front-rear direction is the same as the distance between the front mounting hole 51 and the rear mounting hole 52 in the lower panel 40 in the front-rear direction. Therefore, the lower panel 40 mounted to the seat pan 24 is in a flattened state between the front and rear mounting points 101, 102. On the other hand, the upper panel 42, which is longer in the front-rear direction than the lower panel 40, will sag or can be folded back between the front and rear mounting points 101, 102. Herein, the upper panel 42 is flattened and unfolded such that the fold is not visible in plan view (see FIG. 4B), and is folded inward at the positions of the fasteners 81, 82 (at the front and rear mounting points 101, 102), and has a partially overlapping portion between the front and rear mounting points 101, 102.

As illustrated in FIG. 4C, the lower panel 40 and the upper panel 42 are mutually joined by sewing proximal to the front mounting point 101 and the rear mounting point 102, respectively. The sewing point (joining point) 111 between the lower panel 40 and the upper panel 42 proximal to the front mounting point 101 is positioned on the rear side of the front mounting point 101. The sewing point 111 is positioned, for example, approximately several centimeters from the front mounting point 101. The front mounting point 101 is positioned to the outer side (front side) of the sewing point 111, and therefore is positioned in a non-expanding portion of the airbag cushion 32.

Similarly, the sewing point (joining point) 112 between the lower panel 40 and the upper panel 42 proximal to the rear mounting point 102 is positioned to the front side of the rear mounting point 102. The sewing point 112 is positioned, for example, a few centimeters from the rear mounting point 102. The rear mounting point 102 is positioned to the outer side (rear side) of the sewing point 112, and thus is positioned in a non-expanding portion of the airbag cushion 32.

As described above, in the airbag cushion 32, the lower panel 40 and the upper panel 42 are sewn together at the sewing points 111, 112 in the front-rear direction, while the side panels 44a, 44b are sewn together with the lower panel 40 and the upper panel 42 in the left-right direction. Furthermore, the lower panel 40, upper panel 42 and side panels 44a, 44b demarcate the interior space 33 of the airbag cushion 32.

Note that before the occupant protecting device 30 is attached to the seat pan 24, the left and right side portions of the lower panel 40 and the upper panel 42 may be bound with tape 121a, 121b as illustrated in FIG. 4A. Thus, the occupant protecting device 30 can easily be stored. Furthermore, the tape 121a, 121b may be formed so as to be easily broken by the expansion and deployment of the airbag cushion 32, and the occupant protecting device 30 may be mounted to the seat pan 24 while bound by the tape 121a, 121b.

FIG. 5 illustrates the airbag cushion 32 after expanding and deploying. The airbag cushion 32 expands and deploys primarily between the front and rear mounting points 101, 102. Due to the sagging or folding of the upper panel 42 during mounting, the airbag cushion 32 expands upward between the front and rear mounting points 101, 102. Furthermore, in the expanded and deployed airbag cushion 32, the height (upward expansion) of the rear side portion 132 is greater than the front side portion 131 in the front-rear direction of the vehicle seat 100, when viewed from the side portion direction of the vehicle seat 100 (left-right direction). This is because the side panels 44a, 44b are formed such that the height of the rear side portion 72 is larger than the height of the front side portion 71.

As mentioned above, the rear mounting point 102 of the airbag cushion is positioned below the portion of the thigh of the occupant 200 near the buttocks, in relation to the occupant 200 who is seated on the seating surface 26 in a regular posture. Therefore, the rear side portion 132 of the expanded and deployed airbag cushion 32 lifts the vicinity of the thigh near the buttocks of the occupant 200 via the seating surface 26. In this manner, effective lifting of the knees of the occupant 200 is achieved, and forward movement of the waist of the occupant 200 is suppressed.

As described above, the occupant protecting device 30 according to one aspect of the present embodiment includes the airbag cushion 32 and the inflator 34, the airbag cushion 32 includes the lower panel 40, the upper panel 42, and the side panels 44a, 44b defining the interior space, the upper panel 42 is longer than the lower panel 40 in the front-rear direction, and the upper panel 42 and the lower panel 40 are joined to each other proximal to the front mounting point 101 and the rear mounting point 102.

With the airbag cushion 32 having the 3D (three-dimensional) shape as in this aspect, the upward expansion (stroke or depth) between the front and rear mounting points 101, 102 can be increased while reducing the overall volume when expanded and deployed as compared to an airbag cushion having a conventional 2D shape. In particular, the use of the side panels 44a, 44b contributes to this effect, and joining of the upper panel 42 and the lower panel 40 proximal to the front mounting point 101 and the rear mounting point 102 is advantageous for deploying the side panels 44a, 44b to the intended amount of stroke. Therefore, the vicinity of the thigh near the buttocks of the occupant 200 seated on the seat surface 26 in a regular posture can be effectively pushed upward with a larger stroke. Therefore, the waist restraining performance of the occupant 200 can be improved.

Furthermore, the side panels 44a, 44b are formed such that the height of the rear side portion 72 is higher than the height of the front side portion 71 when viewed from the side portion direction of the vehicle seat 100 when the airbag cushion 32 is expanded and deployed. Therefore, the rear side portion 132 of the expanded and deployed airbag cushion 32 expands upward to a relatively large extent. Accordingly, the vicinity of the thigh near the buttocks of the occupant 200 can be pushed up relatively high, and the vicinity of the thigh can be effectively pushed up.

Furthermore, the front mounting point 101 is provided on the upper panel 42 as well as the lower panel 40. Accordingly, the portion of the airbag cushion 32 proximal to the front mounting point 101 can be prevented from being lifted or being raised more than necessary at the time of expansion and deployment. Similarly, the rear mounting points 102 are provided not only on the lower panel 40 but also on the upper panel 42. Accordingly, the portion of the airbag cushion 32 proximal to the rear mounting point 102 can be prevented from being lifted or being raised more than necessary at the time of expansion and deployment.

Furthermore, there are two rear mounting points 102, 102 spaced apart in the left-right direction. This configuration also contributes to the portion of the airbag cushion 32 proximal to the rear mounting point 102 being prevented from being lifted or being raised more than necessary at the time of expansion and deployment.

Next, a first sewing method for joining the lower panel 40 and the upper panel 42 will be described with reference to FIG. 6A to FIG. 6C.

Figure 6A:
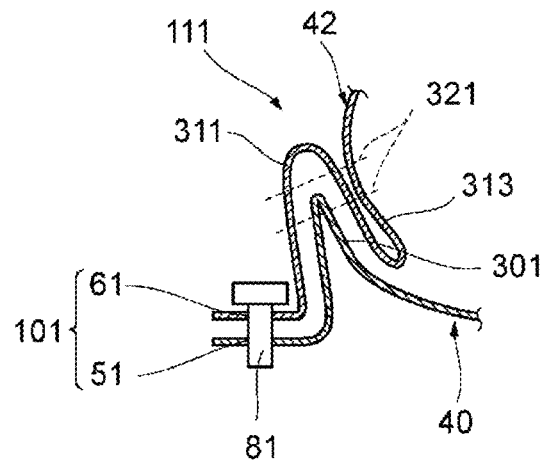
FIG. 6A is an enlarged cross-sectional view schematically illustrating the first sewing point according to the first sewing method of the airbag cushion according to the embodiment.

FIG. 6A illustrates an enlarged view of the first sewing point 111 proximal to the front mounting point 101. The lower panel 40 has a tab part 301, and the upper panel 42 has a tab cover part 311 and a folded back part 313.

The tab part 301 is a portion formed by folding a portion of the lower panel 40 having a prescribed width and extending in the left-right direction of the vehicle seat 100 upward in a mountain fold. Specifically, the tab part 301 is formed by folding a portion of the lower panel 40 on the rear side of the front mounting hole 51 upward or outward for a prescribed length and then folding it downward or inward for a prescribed length.

The tab cover part 311 is a portion formed by folding a portion of the upper panel 42 having a prescribed width and extending in the left-right direction of the vehicle seat 100 upward in a mountain fold, and is provided so as to cover the tab part 301. Specifically, the tab cover part 311 is formed by folding a portion of the upper panel 42 on the rear side of the front mounting hole 61 upward or outward for a prescribed length and then folding it downward or inward for a prescribed length. The tab part 301 is provided inside the tab cover part 311.

The folded back part 313 is a portion formed on the upper panel 42 and folded upward or outward from the rear end of the tab cover part 311. The folded back part 313 is disposed to face the rear side portion of the tab cover part 311.

At the first sewing point 111, the tab part 301, the tab cover part 311, and the folded back part 313 are sewn together with sewing thread 321. As a result, the tab part 301, the tab cover part 311, and the folded back part 313 are integrally coupled.

Figure 6B:
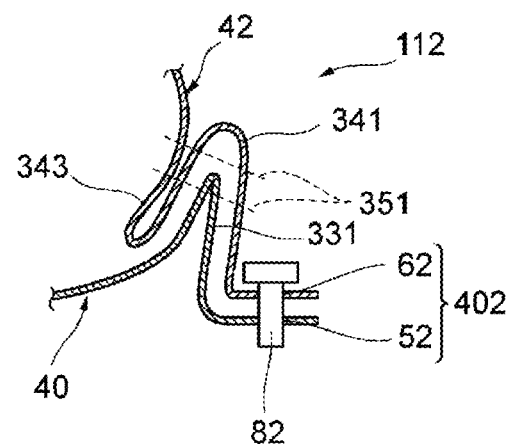
FIG. 6B is an enlarged cross-sectional view schematically illustrating the second sewing point according to the first sewing method of the airbag cushion according to the embodiment.

FIG. 6B illustrates an enlarged view of the second sewing point 112 proximal to the rear mounting point 102. Similar to the first sewing point 111, the lower panel 40 includes a tab part 331 and the upper panel 42 includes a tab cover part 341 and a folded back part 343. Furthermore, as in the case of the first sewing point 111, the tab part 331, the tab cover part 341, and the folded back part 343 are sewn together with the sewing thread 351 at the second sewing point 112 so as to be integrally joined. Note that a detailed description of the tab part 331, the tab cover part 341, and the folded back part 343 at the second sewing point 112 is omitted.

Figure 6C:
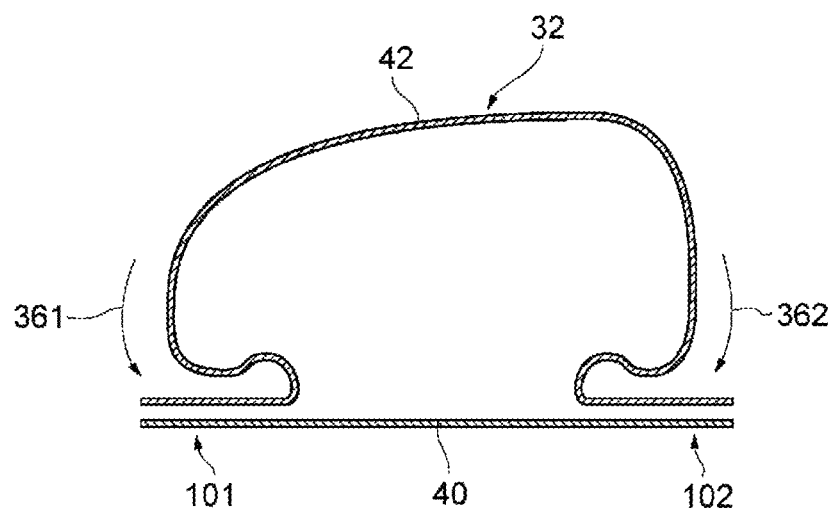
FIG. 6C is a longitudinal cross-sectional view schematically illustrating a condition in which the airbag cushion using the first sewing method according to the embodiment is expanded and deployed.

As illustrated in FIG. 6C, when the airbag cushion 32 using the first sewing method is expanded and deployed, the portions near the front mounting point 101 and rear mounting point 102 are inhibited from lifting or rising more than necessary. Specifically, the aforementioned sewing at the first sewing point 111 causes the front side portion of the upper panel 42 to be pulled downward as indicated by arrow 361 in FIG. 6C. Similarly, the aforementioned sewing at the second sewing point 112 causes the rear side portion of the upper panel 42 to be pulled downward as indicated by arrow 362 in FIG. 6C.

Next, a second sewing method for joining the lower panel 40 and the upper panel 42 will be described with reference to FIG. 7A to FIG. 7C.

Figure 7A:
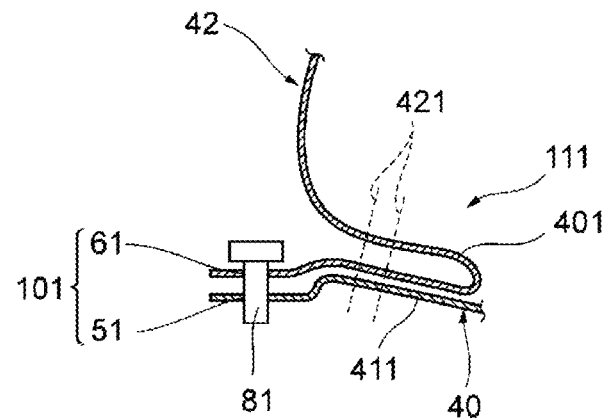
FIG. 7A is an enlarged cross-sectional view schematically illustrating the first sewing point according to the second sewing method of the airbag cushion according to the embodiment.

FIG. 7A illustrates an enlarged view of the first sewing point 111 proximal to the front mounting point 101. The upper panel 42 has a tab part 401. The lower panel 40 does not have such a tab part. In other words, the lower panel 40 has a non-tab part 411 proximal to the front mounting point 101.

The tab part 401 is a portion formed by folding a portion of the upper panel 42 having a prescribed width and extending in the left-right direction of the vehicle seat 100 in a valley fold. Specifically, the tab part 401 is formed by folding a portion of the upper panel 42 on the rear side of the front mounting hole 61 downward or inward for a prescribed length and then folding it upward or outward for a prescribed length. The non-tab part 411 is disposed to face the lower side of the lower side portion of the tab part 401.

At the first sewing point 111, the tab part 401 and the non-tab part 411 are sewn together with sewing thread 421. In other words, the upper side portion and the lower side portion of the tab part 401 and the non-tab part 411 are integrally joined by sewing together with sewing thread 421.

Figure 7B:
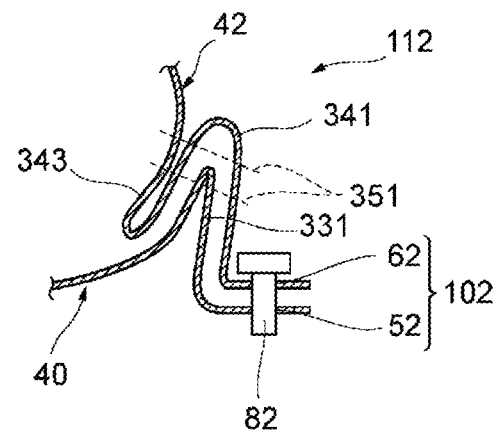
FIG. 7B is an enlarged cross-sectional view schematically illustrating the second sewing point according to the second sewing method of the airbag cushion according to the embodiment.

FIG. 7B illustrates an enlarged view of the second sewing point 112 proximal to the rear mounting point 102. The second sewing point 112 is sewn in the same manner as the second sewing point 112 illustrated in FIG. 6B. In FIG. 7B, the same reference numerals as those in FIG. 6B are shown, and a detailed description thereof is omitted.

Figure 7C:
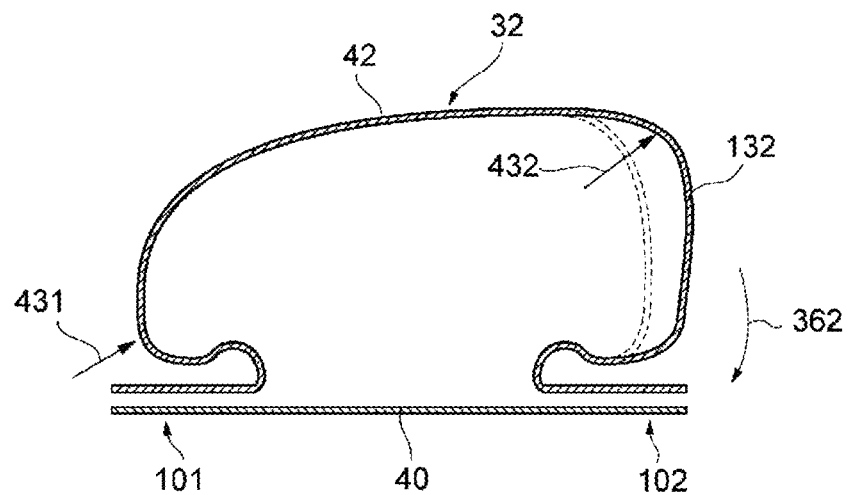
FIG. 7C is a longitudinal cross-sectional view schematically illustrating a condition in which the airbag cushion that uses the second sewing method according to the embodiment is expanded and deployed.

As illustrated in FIG. 7C, when the airbag cushion 32 using the second sewing method is expanded and deployed, the portion near the rear mounting point 102 is inhibited from lifting or rising more than necessary, and the rising position of the front side portion of the upper panel 42, as shown by arrow 431, is shifted to the rearward side. As a result, the upper position of the rear side portion of the upper panel 42 is displaced obliquely rearward and upward as indicated by arrow 432. As a result, the rear side portion 132 of the airbag cushion 32 expands upward to a greater extent when viewed from the side portion direction of the vehicle seat 100. Therefore, the waist restraining performance of the occupant can be improved.

The embodiment described above is for ease of understanding of the present invention and is not intended to be construed as limiting the present invention. Elements included in the embodiment, as well as arrangements, materials, conditions, shapes, sizes, and the like thereof, are not limited to those exemplified, but rather can be appropriately changed.

For example, the number of the front mounting points 101 may be one or may be three or more. Similarly, the number of the rear mounting points 102 may be one or may be three or more. Furthermore, the front mounting point 101 and the rear mounting point 102 may be provided only on the lower panel 40.

EXPLANATION OF CODES

1 . . . Seatback, 2 . . . Seat cushion, 3 . . . Headrest, 4 . . . Reclining mechanism, 10 . . . Seat frame, 20 . . . Seating frame, 22 . . . Side frame, 24 . . . Seat pan, 26 . . . Seat surface, 30 . . . Occupant protecting device, 32 . . . Airbag cushion, 33 . . . Interior space, 34 . . . Inflator, 34a . . . Stud bolt, 40 . . . Lower panel, 42 . . . Upper panel, 44a, 44b . . . Side panel, 51 . . . Front mounting hole, 52 . . . Rear mounting hole, 53 . . . Center mounting hole, 61 . . . Front mounting hole, 62 . . . Rear mounting hole, 71 . . . Front side portion, 72 . . . Rear side portion, 73a, 73b . . . Seam line, 81, 82 . . . Fastener, 91 . . . Front securing position, 92 . . . Rear securing position, 100 . . . Vehicle seat, 101 . . . Front mounting point (first mounting point), 102 . . . Rear mounting point (second mounting point), 111 . . . First sewing point, 112 . . . Second sewing point, 121a, 121b . . . Tape, 131 . . . Front side portion, 132 . . . Rear side portion, 200 . . . Occupant, 301 . . . Tab part, 311 . . . Tab cover portion, 313 . . . Folded back part, 321 . . . Sewing thread, 331 . . . Tab, 341 . . . Tab cover part, 343 . . . Folded back part, 351 . . . Sewing thread, 361, 362 . . . Arrow, 401 . . . Tab part, 411 . . . Non-tab part, 421 . . . Sewing thread, 431, 432 . . . Arrow

The invention claimed is:

1. An occupant protecting device provided inside or below a seat cushion of a vehicle seat, containing:
   an airbag cushion capable of expanding and deploying to push up a seat surface of the seat cushion; and
   an inflator that supplies gas for expansion and deployment into the interior space of the airbag cushion in the event of a vehicle emergency,
   the airbag cushion comprising:
   a lower panel;
   an upper panel with a length in the front-rear direction of the vehicle seat that is longer than that of the lower panel; and
   mutually opposing side panels joined to the lower panel and the upper panel; wherein
   the interior space is defined by the upper panel, the lower panel, and the mutually opposing side panels;
   the side panel is formed such that when the airbag cushion is expanded and deployed, a height of a rear side portion in a front-rear direction of the vehicle seat is greater than a height of a front side portion in the front-rear direction of the vehicle seat, when viewed from the direction of the side part of the vehicle seat;
   the airbag cushion having:
   at least one first mounting point provided on at least the lower panel and attached on the vehicle seat side; and
   at least one second mounting point provided on at least the lower panel and attached to the vehicle seat side on a rear side of the at least one first mounting point in a front-rear direction of the vehicle seat; and
   the lower panel and the upper panel are mutually joined proximal to each of the at least one first mounting point and the at least one second mounting point.

2. The occupant protecting device according to claim 1, wherein the at least one first mounting point and/or the at least one second mounting point is also provided on the upper panel.

3. The occupant protecting device according to claim 1, wherein the lower panel and the upper panel are joined together by sewing.

4. The occupant protecting device according to claim 3, wherein
   a tab part formed by folding a portion of the lower panel having a prescribed width extending in a left-right direction of the vehicle seat in an upward mountain fold;
   a tab cover part formed by folding a portion of the upper panel having a prescribed width extending in a left-right direction of the vehicle seat in an upward mountain fold, provided so as to cover the tab portion; and
   a folded back part formed on the upper panel and folded back upward from a rear end of the tab cover part
   are integrally joined by sewing together at a first sewing point of the lower panel and the upper panel proximal to the at least one first mounting point.

5. The occupant protecting device according to claim 4, wherein the first sewing point is positioned to the rear side of the at least one first mounting point in the front-rear direction of the vehicle seat.

6. The occupant protecting device according to claim 3, wherein
a tab part formed by folding a portion of the upper panel having a prescribed width and extending in a left-right direction of the vehicle seat in a valley fold; and
a non-tab part of the lower panel;
are integrally joined together by sewing, at a first sewing point of the lower panel and the upper panel proximal to the at least one first mounting point.

7. The occupant protecting device according to claim 3, wherein
a tab part formed by folding a portion of the lower panel having a prescribed width extending in a left-right direction of the vehicle seat in an upward mountain-fold;
a tab cover part formed by folding a portion of the upper panel having a prescribed width extending in a left-right direction of the vehicle seat that is provided so as to cover the tab portion in an upward mountain fold; and
a folded back part formed on the upper panel and folded back upward from a front end of the tab cover part
are integrally joined together by sewing, at a second sewing point of the lower panel and the upper panel proximal to the at least one second mounting point.

8. The occupant protecting device according to claim 7, wherein the second sewing point is positioned to the front side of the at least one second mounting point in the front-rear direction of the vehicle seat.

9. The occupant protecting device according to claim 1, wherein a joining point between the lower panel and the upper panel proximal to the at least one first mounting point is positioned to the rear side of the at least one first mounting point in the front-rear direction of the vehicle seat.

10. The occupant protecting device according to claim 1, wherein a joining point between the lower panel and the upper panel proximal to the at least one second mounting point is positioned to the front side of the at least one second mounting point in the front-rear direction of the vehicle seat.

11. The occupant protecting device according to claim 1, wherein
the airbag cushion further comprises at least one third mounting point for attaching the inflator to the vehicle seat side; and
the at least one third mounting point is provided on the lower panel between the at least one first mounting point and the at least one second mounting point.

12. The occupant protecting device according to claim 1, wherein the at least one second mounting point is two or more points spaced apart in the left-right direction of the vehicle seat.

13. The occupant protecting device according to claim 1, wherein the upper panel is folded inward at each position of the at least one first mounting point and the at least one second mounting point, and has portions partially mutually overlapping between the at least one first mounting point and the at least one second mounting point.

14. An occupant protecting device provided inside or below a seat cushion of a vehicle seat, containing:
an airbag cushion capable of expanding and deploying to push up a seat surface of the seat cushion; and
an inflator that supplies gas for expansion and deployment into the interior space of the airbag cushion in the event of a vehicle emergency,
the airbag cushion comprising:
a lower panel;
an upper panel with a length in the front-rear direction of the vehicle seat that is longer than that of the lower panel; and
mutually opposing side panels joined to the lower panel and the upper panel; wherein
the interior space is defined by the upper panel, the lower panel, and the mutually opposing side panels;
the airbag cushion having:
at least one first mounting point provided on at least the lower panel and attached on the vehicle seat side; and
at least one second mounting point provided on at least the lower panel and attached to the vehicle seat side on a rear side of the at least one first mounting point in a front-rear direction of the vehicle seat, wherein the at least one first mounting point and/or the at least one second mounting point is also provided on the upper panel, wherein the lower panel and the upper panel are mutually joined proximal to each of the at least one first mounting point and the at least one second mounting point.

15. The occupant protecting device according to claim 14, wherein the upper panel is folded inward at each position of the at least one first mounting point and the at least one second mounting point, and has portions partially mutually overlapping between the at least one first mounting point and the at least one second mounting point.

16. The occupant protecting device according to claim 14, wherein
a tab part formed by folding a portion of the lower panel having a prescribed width extending in a left-right direction of the vehicle seat in an upward mountain fold;
a tab cover part formed by folding a portion of the upper panel having a prescribed width extending in a left-right direction of the vehicle seat in an upward mountain fold, provided so as to cover the tab portion; and
a folded back part formed on the upper panel and folded back upward from a rear end of the tab cover part
are integrally joined by sewing together at a first sewing point of the lower panel and the upper panel proximal to the at least one first mounting point.

17. The occupant protecting device according to claim 14, wherein
the airbag cushion further comprises at least one third mounting point for attaching the inflator to the vehicle seat side; and
the at least one third mounting point is provided on the lower panel between the at least one first mounting point and the at least one second mounting point.

18. An occupant protecting device provided inside or below a seat cushion of a vehicle seat, containing:
an airbag cushion capable of expanding and deploying to push up a seat surface of the seat cushion; and
an inflator that supplies gas for expansion and deployment into the interior space of the airbag cushion in the event of a vehicle emergency,
the airbag cushion comprising:
a lower panel;
an upper panel with a length in the front-rear direction of the vehicle seat that is longer than that of the lower panel; and mutually opposing side panels joined to the lower panel and the upper panel; wherein the interior space is defined by the upper panel, the lower panel, and the mutually opposing side panels;

the airbag cushion having:

at least one first mounting point provided on at least the lower panel and attached on the vehicle seat side; and at least one second mounting point provided on at least the lower panel and attached to the vehicle seat side on a rear side of the at least one first mounting point in a front-rear direction of the vehicle seat; and at least one third mounting point for attaching the inflator to the vehicle seat side, wherein the at least one third mounting point is provided on the lower panel between the at least one first mounting point and the at least one second mounting point, and wherein the lower panel and the upper panel are mutually joined proximal to each of the at least one first mounting point and the at least one second mounting point.

19. The occupant protecting device according to claim 18, wherein the upper panel is folded inward at each position of the at least one first mounting point and the at least one second mounting point, and has portions partially mutually overlapping between the at least one first mounting point and the at least one second mounting point.

20. The occupant protecting device according to claim 18, wherein a tab part formed by folding a portion of the lower panel having a prescribed width extending in a left-right direction of the vehicle seat in an upward mountain fold;

a tab cover part formed by folding a portion of the upper panel having a prescribed width extending in a left-right direction of the vehicle seat in an upward mountain fold, provided so as to cover the tab portion; and a folded back part formed on the upper panel and folded back upward from a rear end of the tab cover part are integrally joined by sewing together at a first sewing point of the lower panel and the upper panel proximal to the at least one first mounting point.

* * * * *